March 10, 1959

G. R. RACHETER ET AL 2,876,695

ADJUSTABLE BROILER GRILL ASSEMBLY

Filed Jan. 19, 1956

INVENTORS
GEORGE R. RACHETER &
LAWRENCE ALBERTS
BY
Gardner & Zimmerman
ATTORNEYS United States Patent Office 2,876,695
Patented Mar. 10, 1959

2,876,695

ADJUSTABLE BROILER GRILL ASSEMBLY

George R. Racheter, Los Altos, and Lawrence Alberts, Centerville, Calif., assignors to Rheem Manufacturing Company, Richmond, Calif., a corporation of California Application January 19, 1956, Serial No. 560,089

8 Claims. (Cl. 99—423)

This invention relates to a broiler grill assembly for a stove, and particularly for a stove in which the broiler grill compartment may be fitted with equipment for broiling, or alternatively, may be fitted with equipment for barbecuing.

It has become increasingly popular to provide some sort of appliance which may be associated with a stove when it is desired to prepare food by barbecuing. In general, the appliance has been designed to be inserted in the broiler compartment such as is provided in the ordinary domestic stove. In order to insert the appliance in the compartment, it has been necessary to first remove the equipment normally contained within the compartment for broiling. This has presented difficulties, particularly when the broiler compartment is provided with a grill which may be vertically adjusted to different positions without requiring removal of the grill from the compartment. This type of grill is conventionally made as a part of a splash box to which the movable grill members are permanently attached. Accordingly, in order to position the barbecue appliance within the compartment, it has been necessary to remove the broiler unit comprising the grill and box. As a splash box is required in barbecuing, the barbecue appliance has likewise been equipped with a splash box as an integral part thereof.

As both the grill and the barbecue units each include a splash box, each requires a comparatively large space for storage when removed from the compartment, and since in the conventional stove, sufficient room for storing the unused unit is not afforded, the user will always have at least one appliance in addition to and requiring space for storage entirely separate and independent of the stove.

It is an object of the present invention to provide an adjustable broiler grill unit which may be readily removed from the broiler compartment of a stove and easily stored in a conventional storage space provided in the stove.

Another object of the present invention is to provide separate food supporting members interchangeably positionable in a cooking compartment of a stove to provide for use of the compartment as a broiler with an adjustable grill or as a barbecue, and each of such members being readily removable from the compartment and interchangeably positionable in a conventional storage space in the stove, so that the stove may provide for both broiling and barbecuing without requiring an increase in the size or dimensions of the stove, nor will there be any need of storing any appliances outside the confines of the stove.

A further object of the invention is to provide a broiler grill of the adjustable type hereinabove discussed adapted for operative connection with parts of the compartment, but which may be readily disassociated from such parts for removal from such compartment and in a form of maximum compactness to facilitate storage within the confines of the stove when the grill is not in use.

Another object of this invention is to provide in combination with a splash box in a cooking compartment of a stove, separate means interchangeably positionable in the box to provide for alternate use of the compartment as a broiler or barbecue without requiring removal of the box from the compartment.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings.

Figure 1:
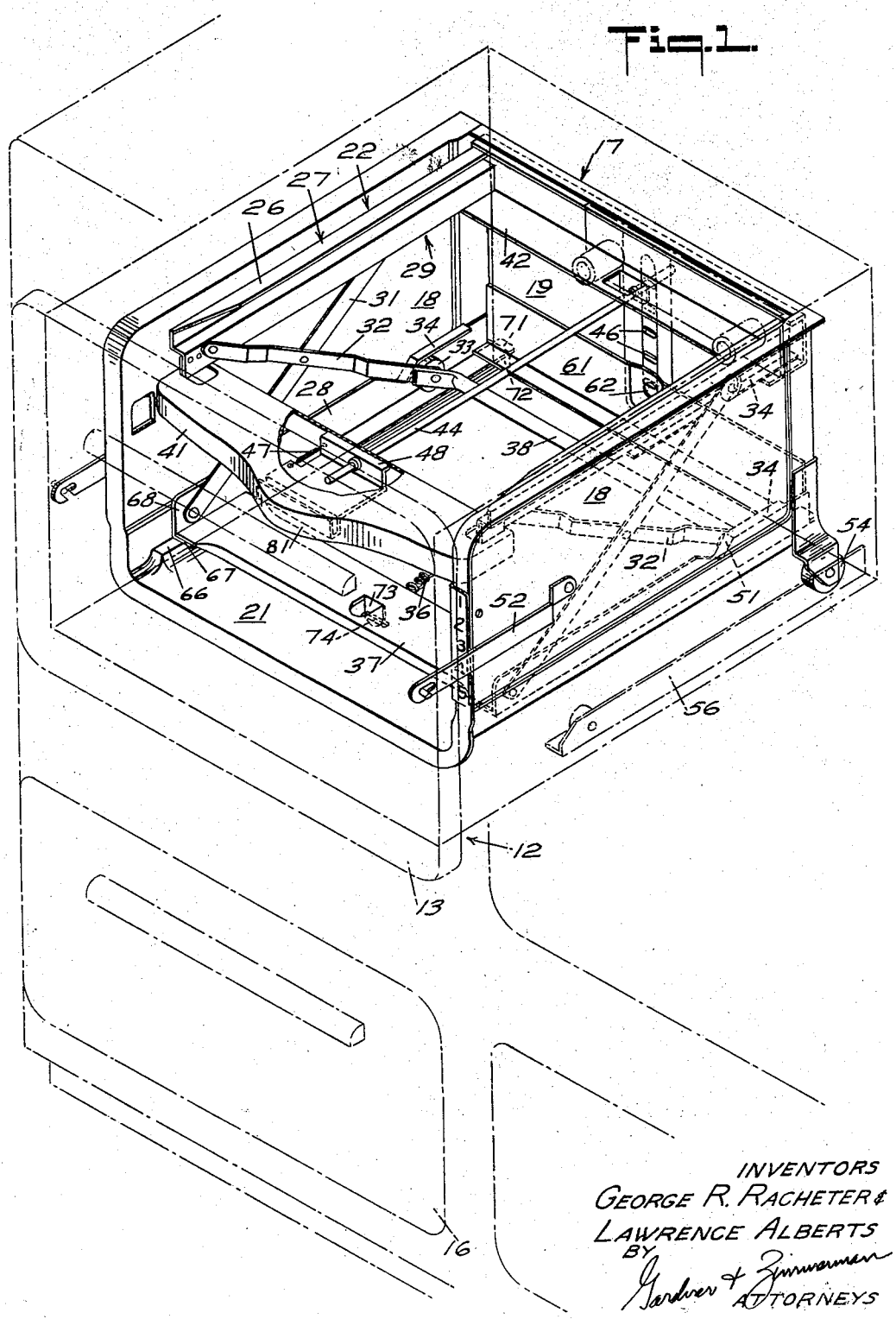
Figure 1 is a perspective view of the adjustable grill unit as operatively mounted in the broiler compartment of a stove, the unit being shown with the grill in its uppermost position.

In the drawings, a portion of a conventional stove is indicated in phantom lines, such portion including a broiler compartment 12 which is provided with an access opening at the front of the stove and closed by a door 13, the latter being hinged at its lower edge to the front wall of the stove. Below the compartment 12 is provided a storage space 14 in which is inserted a drawer having associated therewith a front panel 16 which serves to close the opening to such space in the stove wall when the drawer is fully inserted.

The compartment as indicated is rectangular in shape and accommodates an open top splash box 17 having side walls 18, rear wall 19, and bottom 21, such walls being positioned opposite corresponding walls of the compartment. The front of the box as well as the top is left open so as to afford ample access to the box such as when the door 13 is opened.

As shown in Figure 1, there is positioned within the splash box a broiler grill unit, generally indicated by the numeral 22. This unit is of the type widely used in modern stoves and provides for adjustment of the food supporting grill 23 to different levels in the box so as to vary the space between the food and the heating means, not shown, ordinarily provided at the top of the compartment. The grill 23 is ordinarily associated with an underlying drip pan 24, both grill and pan being slidably and removably mounted within channels 26 comprising part of a grill supporting frame 27.

The frame 27 as here shown, includes lower and upper sections 28 and 29 respectively, the latter having the channels 26. The section 29 is attached to the lower or base section 28 by means of pairs of links 31 and 32 disposed at the sides of the sections. The links are pivoted together in crossed relation at their middle portions, the forward ends of the links being pivotally connected to the upper and lower sections respectively, while the rear ends are slidably associated with the lower and upper sections respectively. The slidable association aforesaid may be effected by means of a roller 33 attached to the rear end of each of the links 31 and 32, and engaging within channel portions 34 at the sides of the sections and movable forwardly and rearwardly therein. In this manner, the upper section 29 may be raised or lowered relative to the lower section while maintaining a general parallel relationship therebetween.

Means are provided for raising the section 29 to various levels in the box and also for retaining the section at the different elevations. As here shown a coil spring 36 is attached at one end to a cross bar 37 provided on the forward end of base section 28 and at its other end to a cross bar 38 affixed to the rear ends of the links 32. By reason of the spring the upper section will at all times be urged to move upwardly, but may be manually urged to a lower position against spring pressure. Mounted for forward and rearward reciprocation in cross members 41 and 42, positioned at the front and rear respectively of the upper section, is a rod 44 designed to engage selectively in a series of vertically spaced apertures 46 formed in the rear wall 19 of the splash box. The rod is urged in a rearward direction by means of a spring 47 connected between cross bar 41 and a handle 48 affixed to the forward end of the rod. As will be evident, by pulling the handle 48 forwardly, the rod 44 will be withdrawn from engagement with any of the apertures 46 so that upper section 29 will be free for movement up or down. When it is desired to retain the section in a selected position so that the grill may be properly spaced from the heating means, the handle is released so that the rod will be urged by spring 47 to extend through the appropriate aperture. Rearward movement of the rod is limited by engagement of the handle with a portion of front cross bar 41. Upward movement of section 29 relative to base 28 is limited by engagement of the rollers with stops 51 associated with the channels 34.

In order to afford better access to the grill 22 when the door to the broiler compartment is open, the splash box is designed to permit movement so that it may be partially extended from the compartment. Such movement is rendered automatic by use of links 52 which connect the box with the door in such manner that when the latter is opened or closed, the box together with the grill unit therein will be moved forwardly and rearwardly in the compartment. Ready movement of the box in the foregoing manner is facilitated by supporting the rear end of the box on rollers 54 engaging tracks 56 on the bottom of the compartment.

Figure 4:
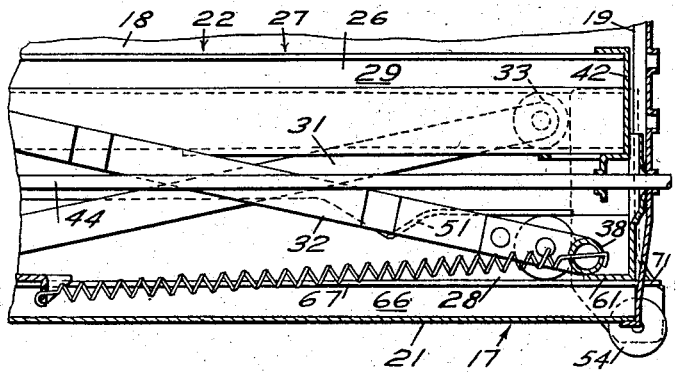
Figure 4 is a fragmentary view similar to Figure 3, but showing the grill in its lowermost position.
Figure 5:
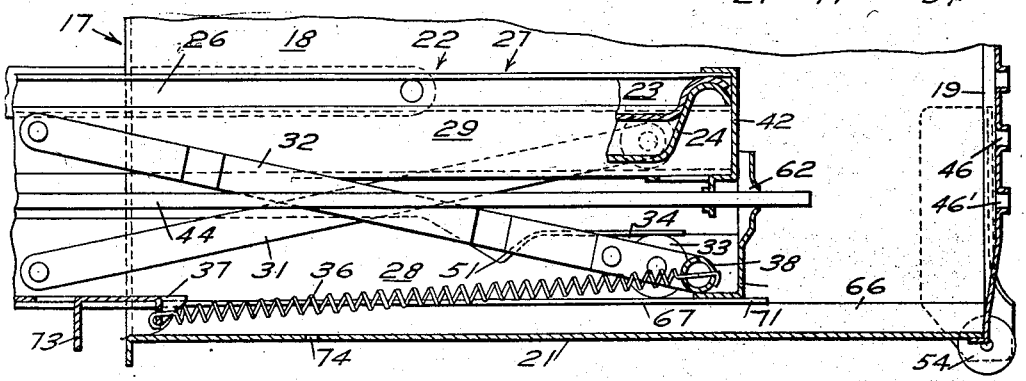
Figure 5 is a view similar to Figure 4 but with the grill unit partially removed from the splash box.

It will be evident from an inspection of Figures 4 and 5 that even when the upper section with the grill is in its lowermost position, the space left between the grill and the heating means in a conventional sized broiler compartment is relatively small and entirely insufficient to receive barbecue equipment and the food supported thereby. Accordingly, when it is desired to use the broiler compartment for barbecuing, it is necessary to entirely remove the broiler grill unit. As heretofore made, the broiler grill unit was permanently mounted in and affixed to the splash box. For example, the lower ends of the links, instead of being attached to a base section as in the present invention, were attached directly to portions of the box. By reason thereof, in order to remove the grill unit from the compartment it was necessary to remove the splash box together with the unit. Since this left the compartment without a splash box, it was necessary to provide a second splash box for use with the barbecue equipment to be inserted in such compartment. This not only entailed the requirement of two splash boxes, but it was impossible to find storage space in the stove to accommodate the unit or equipment not in use. It will thus be clear that there was always a separate appliance which had to be stored without the confines of the stove.

In accordance with our invention, the grill unit is formed separate and apart from any splash box, and the attachment and operation of the various parts thereof are substantially independent of the box so that the unit may be withdrawn from the compartment without the box. In addition, the unit may be removed from the box with the grill and upper section 29 maintained in their lowermost position on the base section 28, whereby the unit is of most compact size and may, for example, be readily stored in the conventional drawer 14 provided in the stove.

As will be seen in the drawings, the rear cross bar 61 of the base section has provided therein an aperture 62 which will be disposed in juxtaposition and in registration with the lowermost 46' of the apertures 46 of the box when the unit is fully positioned within the box. Thus, when the upper section 29 is moved to its lowermost position, the rod 44, when in engaging position, will not only extend through the aperture 46' but through the aperture 62 as well. In this connection it will be understood that when the rod is in the retracted position, the rear end of the rod will clear the apertured cross bar 61 as the sections are brought together or moved apart. It will thus be clear when the upper section is in its lowermost position, as the unit is retracted from the box, the rod 44 will become disengaged from the box aperture 46', but will remain engaged with the aperture 62, and thus prevent relative separation of the sections from the influence of spring 36. Likewise, when the unit is reinserted in the box, the rod 44 will engage with the aperture 46' and thus retain the upper section in its lowermost position independent of the rod engagement with aperture 62.

In order to facilitate the ready removal or reinsertion of the broiler grill unit out of and into the splash box, the bottom of the latter is formed with raised tracks 66 adjacent the sides of the box, and such tracks are designed to be slidably engaged by the under side of side members 67 provided on the base section 28. Preferably, members 67 are provided with side portions 68 and slidably engage the side walls of the splash box so that the unit when reinserted in the box will be properly guided to position the rod 44 relative to the apertures 46. Proper positioning of the unit in the box is further insured by means of tongues 71 which extend rearwardly from members 67 and engage in slots 72 provided in the rear wall of the box. A depending tongue 73 affixed to the forward cross bar 37 of the base section is designed to enter a slot 74 in the box bottom when the unit is fully inserted in the box. In this manner, there will be no danger of the grill unit being accidentally withdrawn from the box. When it is desired to remove the unit, it is simply necessary to tilt the base section upwardly at the front so as to release the tongue 73 from the slot 74, the engagement of tongues 71 with their associated slots 72 being sufficiently loose to permit such tilting action.

The front end of cross bar 41 of the upper section is formed with a gripping portion 81 to facilitate removal of the unit from the box, and preferably the rear side of such portion provides a stop for the rod handle 48 so as to indicate the necessary retraction of the rod required for freeing the upper section for vertical movement.

Figure 2:
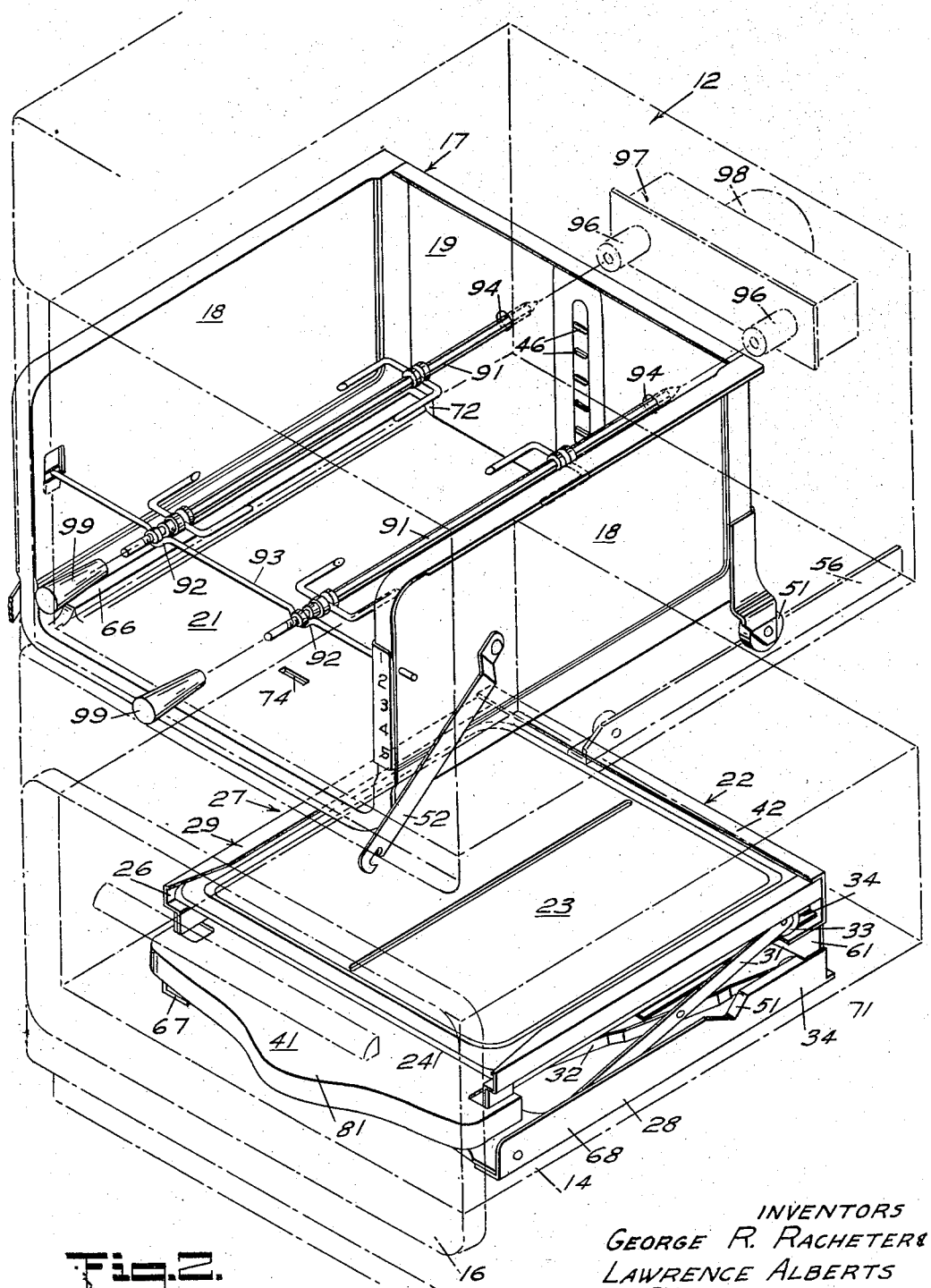
Figure 2 is a view similar to Figure 1 but with the grill unit removed from the broiler compartment and positioned in compacted form within a storage space in the stove, the broiler compartment being shown with parts inserted therein converting the compartment to a barbecue.
Figure 3:
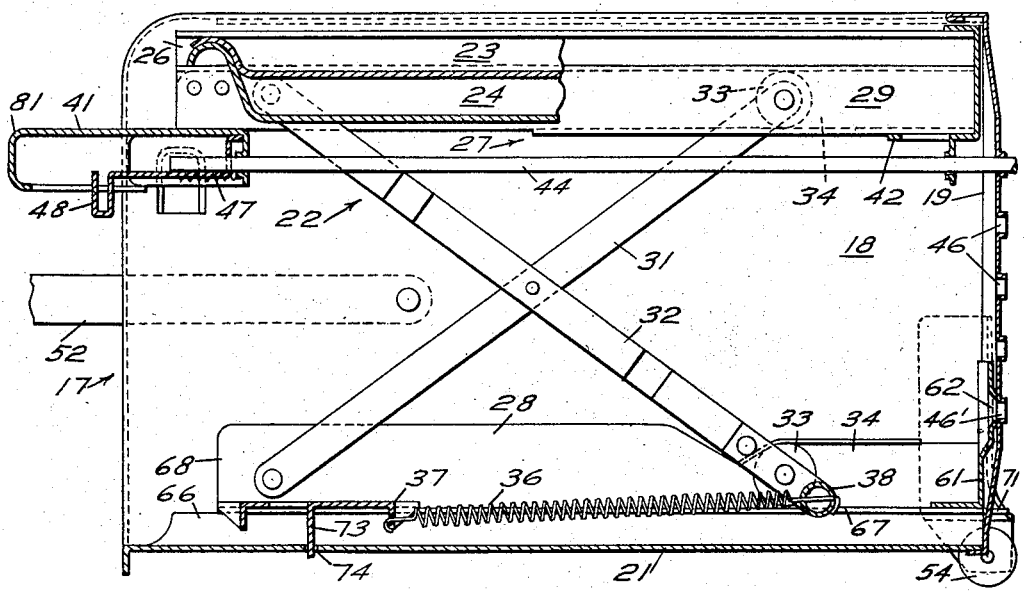
Figure 3 is a vertical sectional view of the adjustable grill unit including the splash box, in the position shown in Figure 1.

Figure 2 illustrates the manner in which the barbecue members are installed in the box when the grill unit is removed therefrom and conveniently stored in drawer 14. Any suitable type of barbecuing equipment may be utilized and may as here shown include a pair of skewers 91 rotatably journalled at the front in offset portions 92 of a rod 93 releasably supported in the box side walls.

The rear end of the skewers are designed to extend through apertures 94 in the rear wall of the box for engagement with suitable adaptors 96 forming part of the drive mechanism 97 for rotating the skewers by means of a motor 98. Desirably, the adaptors are positioned between the rear walls of the box and compartment and the drive and motor are preferably mounted at the back of the rear wall of the compartment. Handles 99 are designed to be releasably mounted on the skewers such as when it is necessary to remove the skewers from their supports. It will be noted that with the barbecue equipment as described, the members thereof may be quickly disassembled, and when removed from the box may be easily stored in the drawer 14 when the grill unit is repositioned in the box.

What is claimed is:

1. Apparatus of the character described including an open top box having a bottom, side walls, a rear end wall and an open front end, an adjustable grill unit including a horizontally disposed base and an upper pan member overlying said base in parallel relation thereto, means interconnecting said member and base for relative vertical movement of the member from and towards said base, means in said box adjacent the bottom thereof slidably supporting said base for movement thereof through the front end of said box, a longitudinally extending element mounted on said member for manual reciprocation thereof, means defining a plurality of vertically spaced apertures on the rear end wall of said box receiving said element in selected positions of adjustment of said member for maintaining such adjusted positions, and said base having a cooperating aperture receiving said element in the lowermost position of said member whereby said base and member may be slidably removed from said box with the base and member in substantially immediately adjacent relation.

2. A broiler grill assembly including an open top box having a bottom, side walls and a rear wall, an adjustable grill unit having a base and a pan member overlying said base, link means interconnecting said base and member for vertical movement of the latter from and towards said base, means normally urging said member towards an upper position removed from said base, means slidably supporting said unit in said box, said rear box wall being provided with a plurality of vertically spaced apertures, a manually movable latch element mounted on said member and engageable in selected apertures for releasably maintaining a selected spacing between said base and member, said base having an aperture adjacent and aligned with a lower aperture on said rear wall for engagement with said element in the lowermost position of said member whereby said grill unit may be removed from said box with the base and member thereof retained with minimum vertical spacing therebetween.

3. An adjustable broiler grill assembly including a base having side members and a transversely extending rear wall having an aperture therein, a frame overlying said base in parallel relation thereto and having side members and transversely extending front and rear walls, a pair of links pivotally secured adjacent their middle portions and interconnecting each adjacent set of side members on the base and frame, one end of each link being pivotally attached to said base and slidably connected with said frame and the other end thereof pivotally attached to said frame and slidably connected with said base, a rod slidably mounted in said frame walls, means normally urging said rod towards and beyond the rear wall of said frame, manually engageable means for moving said rod in the other direction, said rod being adapted to engage in said rear wall aperture of said base when said frame and base are in adjacent relation, and spring means normally urging said frame upwardly and away from said base.

4. A broiler grill assembly including a splash box having a bottom, opposed side walls, a rear wall and an open top and front, an adjustable grill unit including a horizontally disposed base member and an upper member overlying said base in parallel relation thereto, means interconnecting said members for relative vertical movement therebetween, means on the rear wall of said box defining a pair of slots adjacent the side walls thereof, said base member having a pair of tongues slidably engaged with said slots, a downwardly directed tongue on said base member, and means defining a slot in said box bottom for receiving said tongue.

5. Apparatus as set forth in claim 4 in which said box is provided with tracks positioned on said box bottom slidably supporting side portions of said base member whereby said grill unit may be moved from a first position entirely within said box and with said tongues engageable with said slots to a second position entirely removed from said box.

6. An adjustable broiler grill unit comprising a base member, an upper member overlying said base member, link means including rollers attaching said sections together for relative movement from and towards each other, spring means attached to said link means and said base member normally urging said members releasably retaining said members together in their closest relative positions, said latch means includes a rod-like element mounted for axial movement on said upper member, means defining an aperture in said base member in alignment with said element in a lower position of said upper member, and spring means normally urging said element axially outwardly towards the general plane of said apertured means.

7. A broiler grill assembly including a splash box having a bottom, opposed side walls, a rear wall and an open top and front; an adjustable broiler grill unit normally positioned within said box and comprising a base member, an upper member overlying said base member, link means including rollers attaching said sections together for relative movement from and towards each other, spring means attached to said link means and said base member normally urging said members away from each other; means on said box slidably supporting said base member for movement of said grill unit through the open front of said box, and means releasably securing said base member to said box, said upper member is provided with a latch rod, means normally urging said rod towards the rear of said unit, said box rear wall having a plurality of vertically spaced apertures selectively engageable with said rod whereby said upper member may be positioned within said box at selected vertical distances from said base member.

8. A broiler grill assembly including a splash box having a bottom, opposed side walls, a rear wall and an open top and front; an adjustable broiler grill unit normally positioned within said box and comprising a base member, an upper member overlying said base member, link means including rollers attaching said sections together for relative movement from and towards each other, spring means attached to said link means and said base member normally urging said members away from each other; means on said box slidably supporting said base member for movement of said grill unit through the open front of said box, and means releasably securing said base member to said box, said upper member is provided with a latch rod, means normally urging said rod towards the rear of said unit, said box rear wall having a plurality of vertically spaced apertures selectively engageable with said rod whereby said upper member may be positioned within said box at selected vertical distances from said base member, said base member is provided with an aperture adjacent to and in alignment with a lower aperture on said box rear wall whereby said rod will engage said base member aperture in the lowermost position of said upper member and will retain said members in such position upon sliding withdrawal of said unit from said box.

References Cited in the file of this patent

UNITED STATES PATENTS

| | | |
|---|---|---|
| 2,127,146 | Smallen | Aug. 16, 1938 |
| 2,265,421 | Donnelly | Dec. 9, 1941 |
| 2,348,720 | Bobo | May 16, 1944 |
| 2,480,250 | Klemme | Aug. 30, 1949 |